United States Patent
Yang et al.

(10) Patent No.: US 7,884,176 B2
(45) Date of Patent: Feb. 8, 2011

(54) EPOXY/MODIFIED SILICON DIOXIDE CORROSION RESISTANT NANOCOMPOSITE MATERIAL AND PREPARATION METHOD THEREOF

(75) Inventors: Cheng-Chien Yang, Longtan Township, Taoyuan County (TW); Jui-Ming Yeh, Chung Li (TW); Wang Tsae Gu, Longtan Township, Taoyuan County (TW); Chin Yeh Chen, Longtan Township, Taoyuan County (TW); Kung-Chin Chang, Chung Li (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 634 days.

(21) Appl. No.: 11/905,881

(22) Filed: Oct. 5, 2007

(65) Prior Publication Data

US 2009/0093611 A1    Apr. 9, 2009

(51) Int. Cl.
*C08G 65/04* (2006.01)
(52) U.S. Cl. .................. 528/421; 523/466
(58) Field of Classification Search .............. 528/421; 523/466
See application file for complete search history.

(56) References Cited

U.S. PATENT DOCUMENTS

| | | | | |
|---|---|---|---|---|
| 5,019,607 A * | 5/1991 | Coltrain et al. | ............. | 523/435 |
| 5,036,145 A * | 7/1991 | Echterling et al. | .......... | 525/431 |
| 6,197,882 B1 * | 3/2001 | Yanagisawa et al. | ........ | 525/102 |
| 6,872,765 B1 * | 3/2005 | Betz et al. | .................... | 524/261 |
| 7,754,646 B2 * | 7/2010 | Trau et al. | .................... | 502/233 |
| 2003/0059819 A1 * | 3/2003 | Tzeng et al. | .................... | 435/6 |
| 2004/0267038 A1 * | 12/2004 | Tatsumi et al. | ............... | 556/413 |
| 2005/0136082 A1 * | 6/2005 | Soane et al. | ................. | 424/401 |
| 2005/0154170 A1 * | 7/2005 | Klaassens et al. | ............. | 528/27 |
| 2005/0266208 A1 * | 12/2005 | Raychaudhuri et al. | ..... | 428/143 |
| 2005/0284087 A1 * | 12/2005 | Yang et al. | .................. | 52/741.1 |
| 2006/0207187 A1 * | 9/2006 | Gaeta et al. | .................... | 51/293 |
| 2008/0017070 A1 * | 1/2008 | Prezzi et al. | ........... | 106/287.13 |
| 2010/0005727 A1 * | 1/2010 | Gaeta et al. | .................... | 51/295 |

* cited by examiner

*Primary Examiner*—Mark Eashoo
*Assistant Examiner*—Jane L Stanley
(74) *Attorney, Agent, or Firm*—Rosenberg, Klein & Lee

(57) ABSTRACT

An epoxy/modified silicon dioxide corrosion resistant nanocomposite material and a preparation method thereof are disclosed. The method includes the steps of: dispersing TS(TEOS-$SiO_2$) or APTES/TEOS-$SiO_2$ (TAS) in solvent so as to form TS solution or TAS solution; adding triphenylolmethane triglycidyl ether and 1,4-butanediol diglycidyl ether into the TS solution or TAS solution to produce glycidyl ether/TS solution or glycidyl ether/TAS solution. Add a curing agent into the glycidyl ether/TS solution or glycidyl ether/TAS solution to generate epoxy/TS solution or epoxy/TAS solution. After curing, obtain epoxy/modified silicon dioxide nanocomposite corrosion resistant material. The material is applied to optoelectronics or other fields for corrosion prevention.

14 Claims, 15 Drawing Sheets

EPOXY/MODIFIED SILICON DIOXIDE CORROSION RESISTANT NANOCOMPOSITE MATERIAL AND PREPARATION METHOD THEREOF

BACKGROUND OF THE INVENTION

The present invention relates to a nano-scale corrosion resistant composite material, especially to a of epoxy/modified silicon dioxide nanocomposite that is gas resistant and corrosion resistant for being applied to optoelectronics, fire-retardant materials, food packaging materials, corrosion resistant materials or other fields for corrosion prevention.

When chemical reaction occurs on metal surface and turns the metal into metal oxide, the metal properties such as metallic shine, mechanical strength, physical property and chemical property change and this is called corrosion. When metal surface contacts with air, oxide and water in the air reacts with iron to produce rust, reacts with copper to generate patina, or reacts with silver to generate black metal oxide. The cost for replacing part or total corrupted metal and the cost for coping with corrosion per year all over the world is billions. Thus metal corrosion has become an important issue. The corrosion speed of metal depends on environmental conditions. However, no matter the speed is quick or slow, the metal corrosion is closely related to materials on surroundings because the corrosion is caused by contact between metal and environmental materials. The content of corrosion varies under different environments.

A research in 1998 pointed that the cost of loss caused by metal corrosion is about 4.9% of Gross Domestic Product. The loss caused by corrosion is dramatically higher than loss due to flood, fire and earthquake. Only corrosion related to cars leads to loss over 16 billions. Moreover, corrosion also cause waste of resources. About 40% of steel produced by all steel plants is used to replace the corroded metal. Iron is the most common used metal and occupies 90% of the total production of metal. In the future, the demand of steel still keeps growing. Through smelting operation, iron oxide is reduced to generate iron and steel. Thus there is a tendency of metals to easy to revert back to their ore form. For example, cast iron forms reddish-brown iron oxide—this is called rusting. Especially Taiwan locates in the subtropical zone and the environment is high-temperature, high-humidity and high salinity, both create a place for corrosion. Although a large amount of plastic is used to prevent corrosion, iron and steel are still indispensable materials for modern industries due to their easy processing, low cost and recyclability.

There are a plurality of ways to prevent metal corrosion such as surface treatment, plating, corrosion inhibitor, electro-protection, thermal spray, coating etc. The most economic and convenient way painting. This way is applied broadly to maintenance of steel structure. For example, Golden Gate Bridge, a landmark construction of San Francisco is protected mainly by coating.

By coating, an evenly membrane is formed on surface of material so as to isolate possible factors that cause corrosion such as air and water. In order to prevent corrosion, conventional way is to paint red lead, zinc chromate, strontium chromate, and calcium plumbate as a base layer. Yet these paints all include heavy metal that causes pollution. At the same time, these pollutants are carcinogens and result in other diseases so that they are prohibited gradually.

The most common way to prevent corrosion is to effectively isolate metal with environmental factors that cause corrosion. Generally, there are three ways for corrosion protection and prevention—electro-protection, coating, and corrosion inhibitor. In electrochemistry field, a plurality of corrosion protection ways are applied such as painting, plating, phosphating, anodizing, metallic coating protection, nonmetallic coating protection, and electro-protection. The painting way uses organic coatings. As to research of anticorrosive coating materials, organic conjugated conducting polymer such as polyaniline is the most perspective. Due to reversible chemical structure, it induces a passive oxide layer on metal surface so as to reduce corrosion effectively. Thus quite a lot scientists are dedicated to the research in this field.

While applying conventional anticorrosive primer or paint, rust removing on metal surface should be done completely. Otherwise during dead time of painting, metal surface contacts with air and have oxidation reaction immediately. Moreover, conventional rust-preventing primer such as red lead, zinc chromate, inorganic zinc coating, aluminium phosphate, and resins can only cover on surfaces. After a period of time, oxygen and water molecule penetrate the covering membrane and the metal surface is oxidized within a few months. Thus it's impossible to remove rust completely and coatings (paintings) should be applied often so as to maintain corrosion protection effect.

In recent years, a plurality of research projects is conducted on organic/inorganic nanocomposites. A lot of papers related to epoxy/TS nanocomposites are presented. The published liter shows that the research of epoxy/TS nanocomposites performing now focuses on their synthesis, identification, reaction mechanism, thermal properties and mechanical properties. However, gas barrier property and corrosion control are seldom mentioned about.

Conventional corrosion resistant coating has many disadvantages such as heavy metal therein that leads to pollution and works as carcinogen, and high cost of repeated painting at certain intervals for maintaining corrosion prevention. Therefore, there is a need to provide a novel epoxy/TS nanocomposites with properties of gas barrier (oxygen and water) and corrosion protection for being applied to corrosion prevention of optoelectronics or other fields.

SUMMARY OF THE INVENTION

Therefore it is a primary object of the present invention to provide a preparation method of epoxy/modified silicon dioxide corrosion resistant nanocomposite material. The epoxy/modified silicon dioxide nanocomposite material prevents penetration of oxygen and moisture so that metal will not be oxidized by oxygen so as to achieve corrosion prevention.

It is another object of the present invention to provide a preparation method of epoxy/modified silicon dioxide corrosion resistant nanocomposite material. The epoxy/modified silicon dioxide material causes no illness, pollution and includes no carcinogen.

It is a further object of the present invention to provide a preparation method of epoxy/modified silicon dioxide corrosion resistant nanocomposite material. For corrosion protection, such epoxy/modified silicon dioxide material doesn't need to coat on the metal surface so often. Thus cost and labor for applying corrosion prevention material are saved.

In order to achieve objects, a preparation method of the present invention includes the steps of: dispersing TS(TEOS-$SiO_2$) or APTES/TEOS-$SiO_2$ (TAS) in solvent so as to form TS solution or TAS solution; adding triphenylolmethane triglycidyl ether and 1,4-butanediol diglycidyl ether into the TS solution or TAS solution to produce glycidyl ether/TS solution or glycidyl ether/TAS solution; adding a curing agent into the glycidyl ether/TS solution or glycidyl ether/TAS solution to generate epoxy/TS solution or epoxy/TAS solution; and curing to obtain epoxy/modified silicon dioxide nanocomposite corrosion resistant material. The epoxy/modified silicon dioxide nanocomposite material is epoxy/TS or epoxy/TAS. The TS or the TAS is 1-10 wt % of the epoxy/modified silicon dioxide nanocomposite corrosion resistant material.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
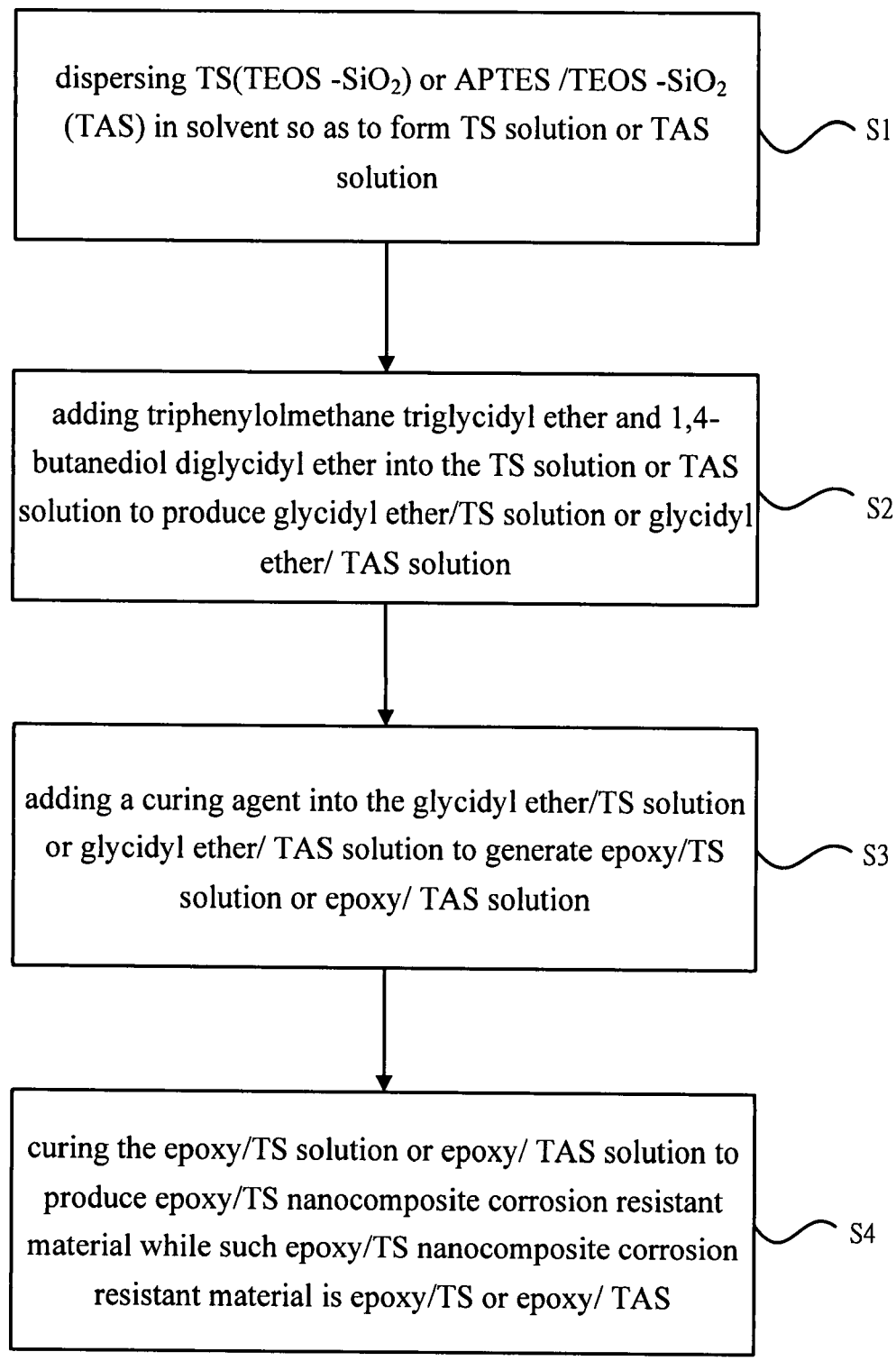
FIG. 1 is a flow chart showing steps of a preparation method of epoxy/modified silicon dioxide corrosion resistant nanocomposite material according to the present invention.

As shown in FIG. 1, a preparation method of epoxy/modified silicon dioxide nanocomposites includes following steps:
S1 dispersing TS(TEOS-$SiO_2$) or APTES/TEOS-$SiO_2$ (TAS) in solvent so as to form TS solution or TAS solution;

S2 adding triphenylolmethane triglycidyl ether and 1,4-butanediol diglycidyl ether into the TS solution or TAS solution to produce glycidyl ether/TS solution or glycidyl ether/TAS solution;

S3 adding a curing agent into the glycidyl ether/TS solution or glycidyl ether/TAS solution to generate epoxy/TS solution or epoxy/TAS solution;

S4 curing the epoxy/TS solution or epoxy/TAS solution to produce epoxy/TS nanocomposite corrosion resistant material while such epoxy/TS nanocomposite corrosion resistant material is epoxy/TS or epoxy/TAS.

wherein weight of the TS or the TAS ranges about 1-10% of the weight of the epoxy/modified silicon dioxide nanocomposite corrosion resistant material;

wherein the TS is formed by a sol-gel method. TS is prepared by the reaction of hydrolysis of tetraethyl orthosilicate, alcohol and acid, and then followed by a condensation reaction. The TAS is made by modification of TS. The weight ratio of triphenylolmethane triglycidyl ether to 1,4-butanediol diglycidyl ether is 1:1. The optimum ratio of triphenylolmethane triglycidyl ether to trimethylolpropane tris[poly(propylene glycol), amine terminated]ether (T-403) is 1:0.5408 while the optimum ratio of 1,4-butanediol diglycidyl ether to trimethylolpropane tris[poly(propylene glycol), amine terminated]ether (T-403) is 1:0.8209. The reaction temperature of step S3 is room temperature. The preferred epoxy/TS nanocomposite corrosion resistant material is epoxy/TAS. The weight of the TS or the TAS ranges about 1-10% of the weight of the epoxy/TS nanocomposite corrosion resistant material while 5% is optimum.

A Preparation Method of TS
(1) Take 20.83 g tetraethyl orthosilicate (TEOS), 10.0 g alcohol and 7.2 g 1N hydrochloric acid (HCl) into a 250 ml two neck round bottom flask that is connected with a condenser, a thermometer and a nitrogen gas input and output system. Use a magnetic bar to stir and heat the mixture to 80 degrees Celsius. Keep solution at this temperature until the solution become sticky.
(2) The two neck round bottom flask with sticky solution is quickly cooled to room temperature by ice.
(3) The solution is poured into a wide mouth polypropylene bottle and the solvent is evaporated naturally so that the material shrinks and cracks into pieces.
(4) Grind the pieces into powder to produce TEOS-$SiO_2$ (TS).

A Preparation Method of Modified TS (TAS):
(1) Take 2.21 g 3-aminopropyltriethoxysilane (APTES) and 10 g 1N hydrochloric acid (HCl) into a 50 ml beaker and stir the solution by a magnetic bar to form a first solution.
(2) Take 18.75 g TEOS, 10.0 g alcohol and 7.2 g 1N hydrochloric acid into a 250 ml two neck round bottom flask that is connected with a condenser, a thermometer and a nitrogen gas input and output system. Use a magnetic bar to stir and heat the mixture to 80 degrees Celsius. Keep solution at this temperature until the solution become sticky to produce TS sol-gel solution.
(3) The two neck round bottom flask with sticky TS sol-gel solution is quickly cooled to room temperature by ice.
(4) Add the first solution into the cooled TS sol-gel solution, being stirred by the magnetic bar to a evenly and a bit sticky solution;
(5) Pour the mixture into a wide mouth polypropylene bottle and the solvent is evaporated naturally so that the material shrinks and cracks into pieces.

(6) Grind the pieces to produce APTES/TEOS-SiO$_2$ (TAS) powder.

EXAMPLE (1) Take different amount of TS powder or TAS powder (1, 3, 5, 10 wt % of the total weight of the epoxy/TS nanocomposites), add into N,N-dimethylacetamide (DMAc) and stir the mixture at room temperature for 24 hours to produce TS or TAS solution.

(2) Add 0.5 g triphenylolmethane triglycidyl ether (TGTPM, a kind of epoxy) and 0.5 g 1,4-butanediol diglycidyl ether (BPA, a kind of epoxy) into TS or TAS solution stir the solution at room temperature for 30 minutes to generate glycidyl ether/TS solution or glycidyl ether/TAS solution.

(3) According to equivalence ratio, take 0.6809 g (trimethylolpropane tris[poly(propylene glycol), amine terminated] ether (T-403) add into above glycidyl ether/TS solution or glycidyl ether/TAS solution. Stir the mixture at room temperature for 10 minutes so as to produce epoxy/TS solution or epoxy/TAS solution;

(4) Take certain amount of solution (epoxy/TS solution or epoxy/TAS solution) and pour it on a 5 cm×5 cm Teflon mold.

(5) Perform curing. Curing temperature is heating from room temperature to 50° C. and heating time is 11-12 hours. After that, increase the temperature to 80° C. and heat for 0.5 hour. Then increase the temperature to 100° C. and heat for 6-8 hours. Next increase the temperature to 120° C. and heat for 0.5 hour. At last, cool down to room temperature.

(6) get epoxy/modified silicon dioxide nanocomposite material is obtained.

Structure Identification of TEOS-SiO$_2$ (TS) and APTES/TEOS-SiO$_2$ (TAS)

1. Fourier Transform Infrared Spectroscopy (FTIR) Analysis

Figure 2:
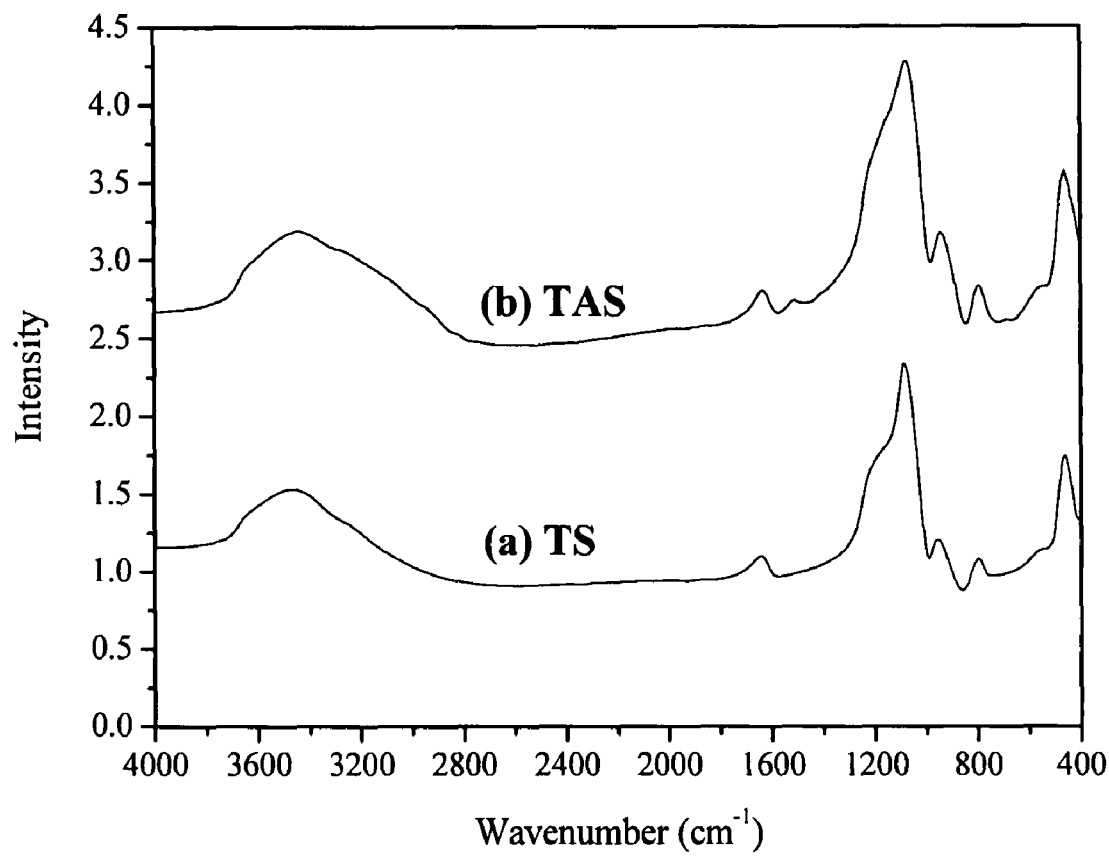
FIG. 2 is a FTIR spectrum of epoxy/TS and epoxy/TAS according to the present invention.

The molecular structure of TEOS-SiO$_2$ (TS) and APTES/TEOS-SiO$_2$ (TAS) produced by the present invention need to be verified by FTIR to confirm the structure is as expected. The infrared spectroscopy is a fast and convenient way to confirm the structure. By easy operated infrared spectroscopy, tiny changes of chemical properties are observed. Once change of the chemical structure of inorganic TEOS-SiO$_2$ (TS) is confirmed, it is checked whether a chemical bonding formed between the chemical modifier-APTES and the TEOS-SiO$_2$ (TS). Refer to FIG. 2, curve (a) represents unmodified TEOS-SiO$_2$ (TS) curve (b) represents TAS (APTES-modified TS). The symmetrical absorption peak of Si—O—Si is at 791 cm$^{-1}$ and asymmetric absorption peak is at 1064 cm$^{-1}$ while another "characteristic absorption peak is at 1630 cm$^{-1}$, located among peaks within 1600~1700 cm$^{-1}$.

Generally, the absorption peak located on 1600~1700 cm$^{-1}$ is a sharp peak. However, in the curve (b) in FIG. 2 the peak is wider and disordered than a common one because thus absorption peak is formed by a plurality of absorption peaks. Being different from unmodified silicon dioxide, the curve (b) has a characteristic absorption peak at 1508 cm$^{-1}$ obviously besides the absorption peak of Si—O—Si mentioned above. This is resulted from a specific functional group —CH$_3$ of the APTES molecule. By introduction of organic APTES molecule to inorganic TS skeleton, a weak absorption peak of —NH$_2$ also falls in a range of 3300~3400 cm$^{-1}$. Moreover, absorption peak of SiOH bending is observed at 934 cm$^{-1}$ while absorption peak of SiOH stretch is observed at 3437 cm$^{-1}$.

In summary, according to the above FTIR, it is verified the APTES molecule really exists among the inorganic TS (modified silicon dioxide).

2. $^{13}$C Solid-State NMR Analysis

Due to 3 dimensional network structure generated by Sol-Gel reaction, the product is insoluble in any solvent. Thus general solution NMR (Nuclear Magnetic Resonance) is not applied to identification of the product, instead, solid-NMR is used. However, solid-NMR has a shortcoming—the measured absorption peak is not as sharp as the one obtained by solution NMR. Thus the characteristic peak thereof is also wider.

Figure 3:
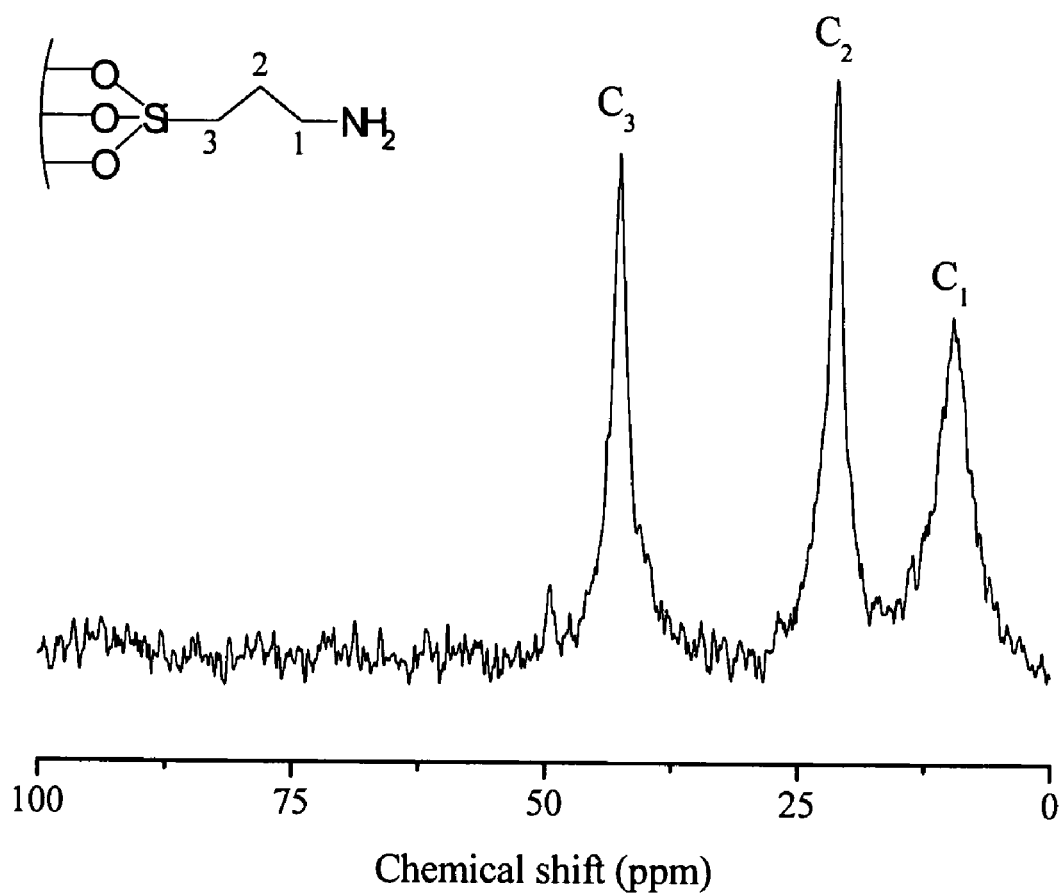
FIG. 3 is a $^{13}C$ CP/MAS NMR spectrum of epoxy/TAS according to the present invention.

Refer to FIG. 3, a $^{13}$C CP/MAS NMR spectrum of TAS produced by TEOS and the modifier APTES in the molecular ratio of 9:1 is disclosed. On top left, possible structure of functional group APTES bonding on surface of inorganic TS is shown. In contrast, the absorption position is respectively labeled from $C_1$~$C_3$ and the chemical shift respectively is 9.63 ppm ($C_1$), 21.14 ppm ($C_2$) and 42.70 ppm ($C_3$). Through chemical shift of these three absorption peaks, it is learned that the modifier APTES is bonded on inorganic TS.

3. $^{29}$Si Solid-State NMR Analysis

During processes of preparing inorganic TS, a sol-gel method is used. The reacting condition of the sol-gel reaction directly affects chemical structure of inorganic TS. Only by infrared spectroscopy, it is difficult to differentiate various silicon branches and further increase difficulties in analysis. Due to process of NMR spectrum, $^{29}$Si-NMR is studied and developed and has become the most important method for identifying silicon compounds The chemical shift in solid $^{29}$Si-NMR spectrum is used to check bonding between silicon atoms and oxygen atoms in the mesoporous material.

For identification of silicon structure, the chemical structure of organic silicon (T) and inorganic silicon (Q) are defined as followings:

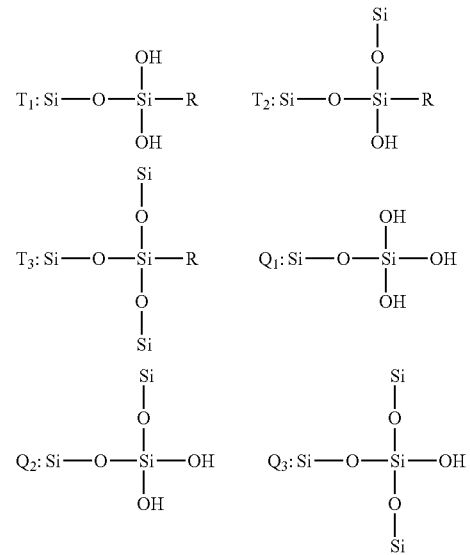

-continued

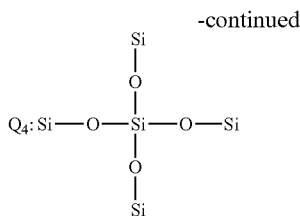

Figure 4:
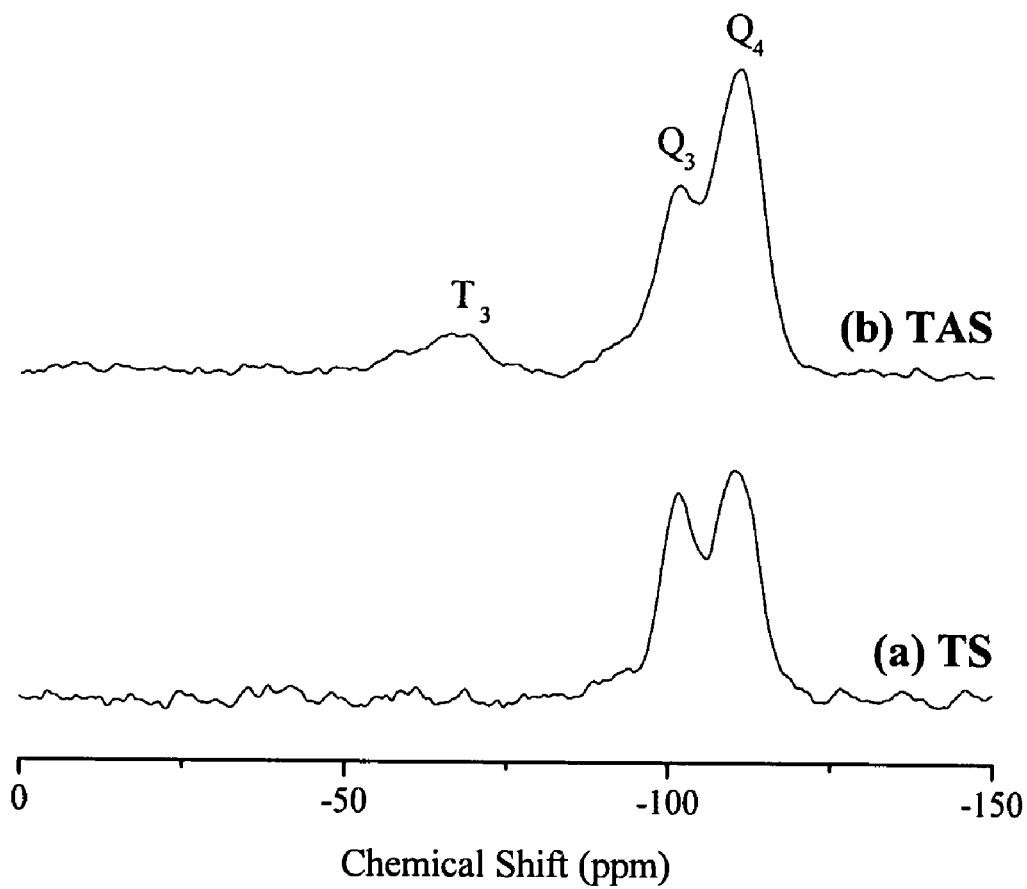
FIG. 4 is a $^{29}Si$-NMR spectrum of epoxy/TS and epoxy/TAS according to the present invention.

No matter T or Q, the more completely the condensation reaction is, the lower the electron shielding effect is. Thus the absorption peak moves towards up-field. Refer to FIG. 4, a curve (a) represents unmodified inorganic TS and the chemical shift is observed between δ=−100~110 ppm. This is typical absorption peak of silicon in Q series compounds. The chemical shift δ of the absorption peak is respectively at −101.37 ppm and −110.59 ppm. This means chemical structure of inorganic TS consists of $Q_3$ [Si(OSi)$_3$OH] and $Q_4$ [Si(OSi)$_4$].

After being modified by APTES, the $^{29}$Si-NMR spectrum is as a curve (b) shown in FIG. 4. The chemical shift δ of the absorption peak of TAS is −67.80 ppm. The chemical shift in this range is due to absorption of T series compounds. The chemical structure is $T_3$ [RSi(OSi)$_2$], wherein R is organic chain end of APTES. Through $^{29}$Si-NMR spectrum, it is learned that a strong chemical (covalent) bonding is generated between APTES molecule and network crosslinking TS. This leads to obvious shift in the spectrum.

Structure Identification of Epoxy/Modified Silicon Dioxide Nanocomposite

Figure 5:
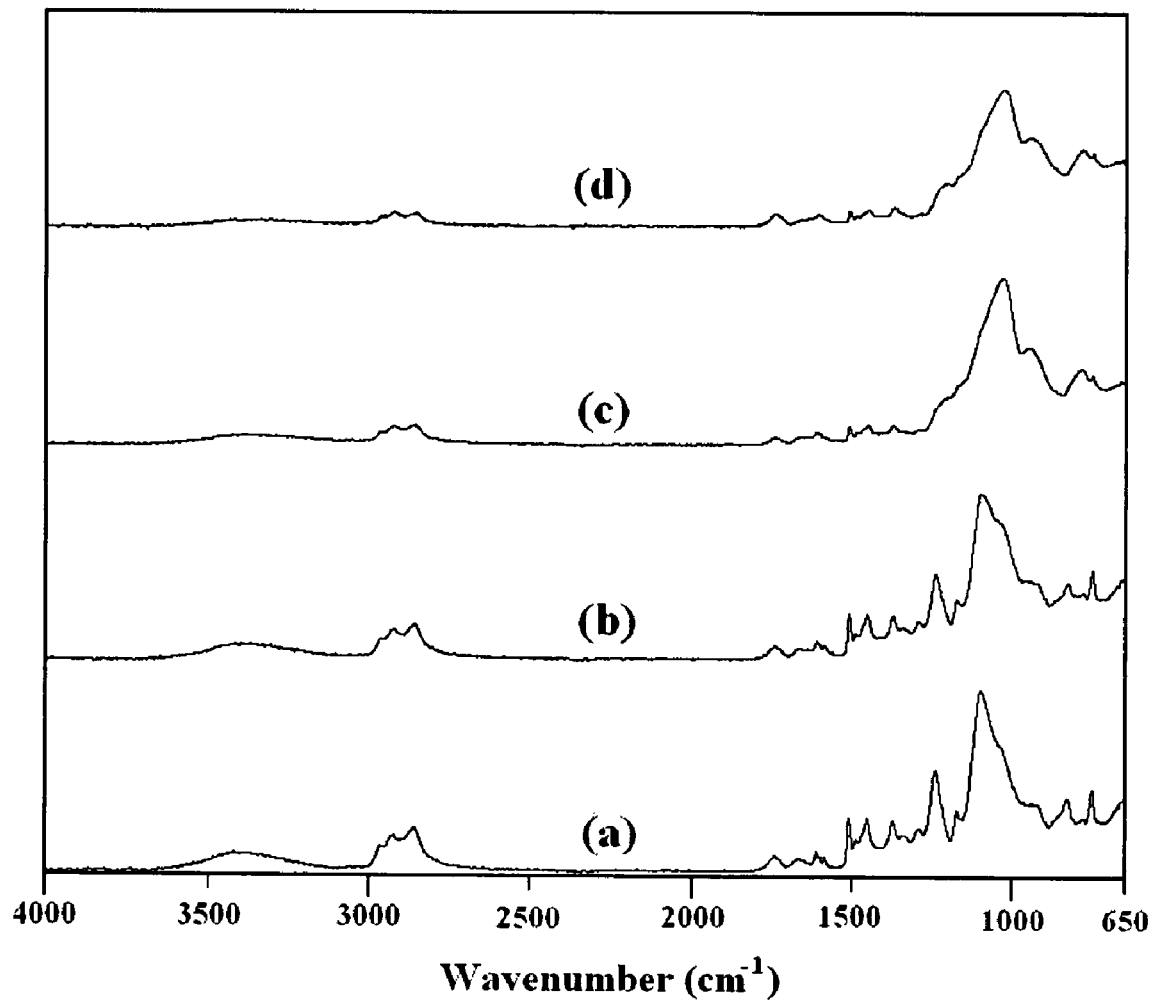
FIG. 5 is a FT-ATR spectra of epoxy/TAS nanocomposite with different amount of TAS according to the present invention.

1. Fourier Transform Attenuated Total Internal Reflection Infrared Spectroscopy (FT-ATR) Analysis Refer to FIG. 5, curve (a) represents pure epoxy, curve (b) represents epoxy/1% TAS, curve (c) represents epoxy/3% TAS, and curve (d) represents epoxy/5% TAS. It is learned that peak of epoxide ring group is at cm$^{-1}$. When the characteristic peak of the epoxide ring group disappears and characteristic peak of hydroxyl group is observed at 3380 cm$^{-1}$ apparently, the epoxide ring is opened. On the other hand, crosslinking of thermoset polymer is a kind of addition reaction. In initiation reaction of the polyamine curing agent and the epoxy resin, a primary amine is used for ring-opening to produce 2° —OH and secondary amine. Then the propagation reaction continues between 2° —OH and secondary amine to get high-density crosslinked network. Therefore, according to FT-ATR, peak at 1233 cm$^{-1}$ is absorption peak of ether link (C—O—C). This further proves ring opening of epoxy resin. Moreover, the main four characteristic peaks of TAS are Si—O—Si (symmetric) at 791 cm$^{-1}$, Si—O—Si (asymmetric) at 1064 cm$^{-1}$, SiOH bending at 934 cm$^{-1}$, and SiOH stretch at 3437 cm$^{-1}$. By curves (b)-(d) in FIG. 5, the nanocomposite material is proved to have characteristic peak of epoxy as well as TAS.

2. Transmission Electron Microscopy (TEM) Analysis

It is learned through papers that under TEM, modified silicon dioxide looks similar to round structure. With low amplification factor, distribution of modified silicon dioxide in polymer substrate is observed. With higher amplification factor, particle size is observed.

Figure 6A:
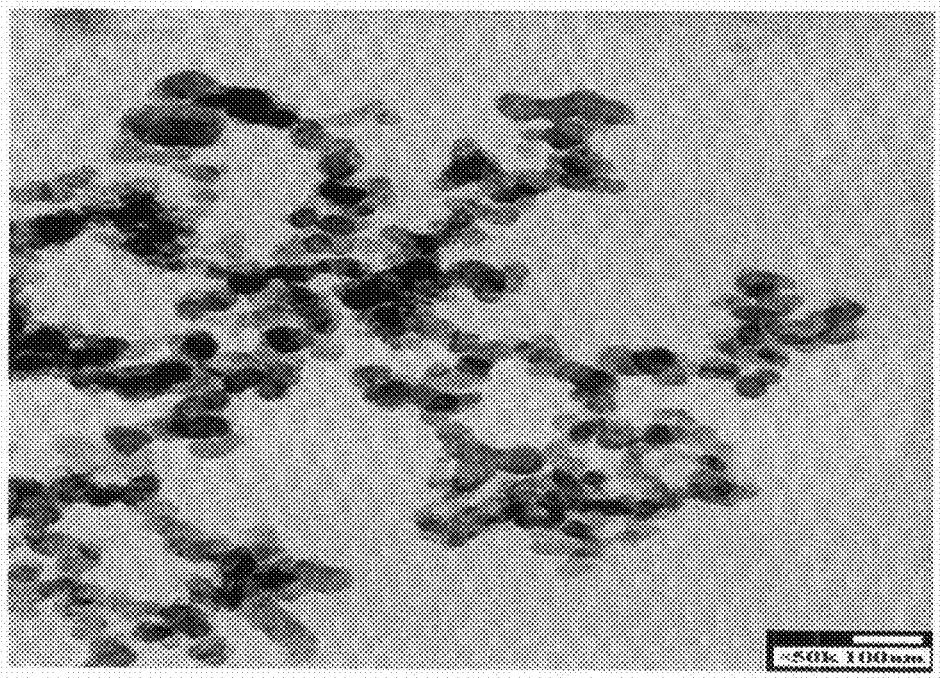
FIG. 6A is a TEM photo of epoxy/5% TAS nanocomposite material according to the present invention.
Figure 6B:
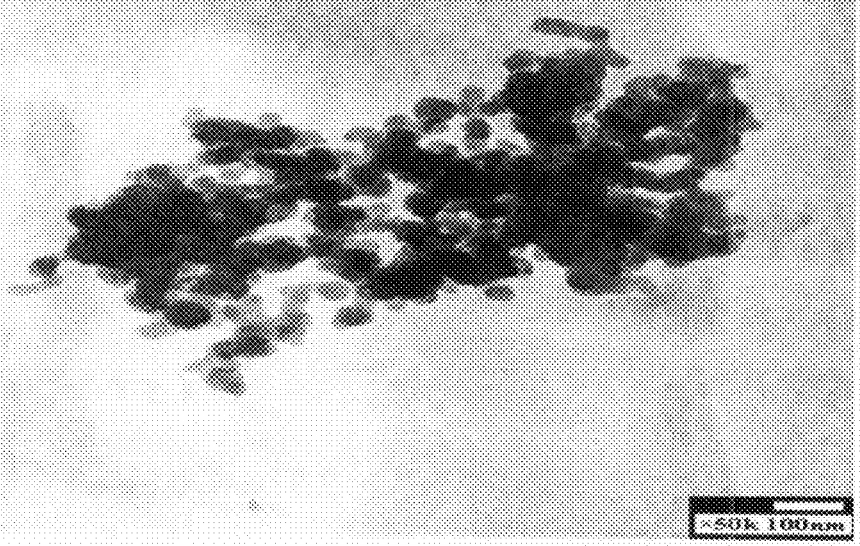
FIG. 6B is a TEM photo of epoxy/5% TS nanocomposite material according to the present invention.

Refer to FIG. 6A and FIG. 6B, TEM figures at magnification of fifty thousand times of epoxy/5% TAS and epoxy/5% TS nanocomposites are disclosed. In the figures, bright area represents epoxy while the black area is modified silicon dioxide. It is discovered that average diameter of modified silicon dioxide (TS and TAS) is 20-40 nm and inorganic nano-scale modified silicon dioxide is distributed over organic epoxy substrate. By comparison of the two figures, it is found that the distribution condition of nanocomposite added with TAS is better than that with TS.

By addition of modified silicon dioxide, properties of polymer such as corrosion resistance and gas barrier are improved. The more even the distribution is, the more improvement the properties are. Thus test results of various properties of epoxy/TAS are suppose to be better than those of peoxy/TS. The followings are tests results of various properties of epoxy/modified silicon dioxide corrosion resistant nanocomposite material.

Thermal Properties Analysis

1. Thermogravimetric Analysis (TGA)

By thermogravimetric analysis (TGA), thermal properties of material are measured and changes of decomposed temperature ($T_d$) and Char yield after addition of TS or TAS are found.

Figure 7A:
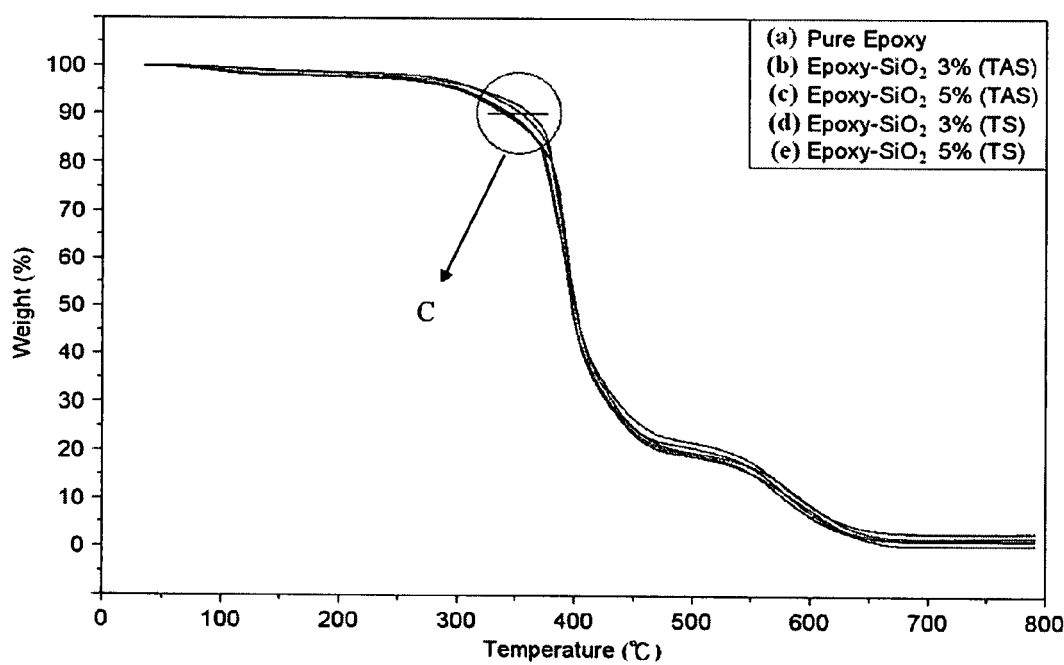
FIG. 7A is thermal gravimetric analysis of epoxy/TS and epoxy/TAS according to the present invention.
Figure 7B:
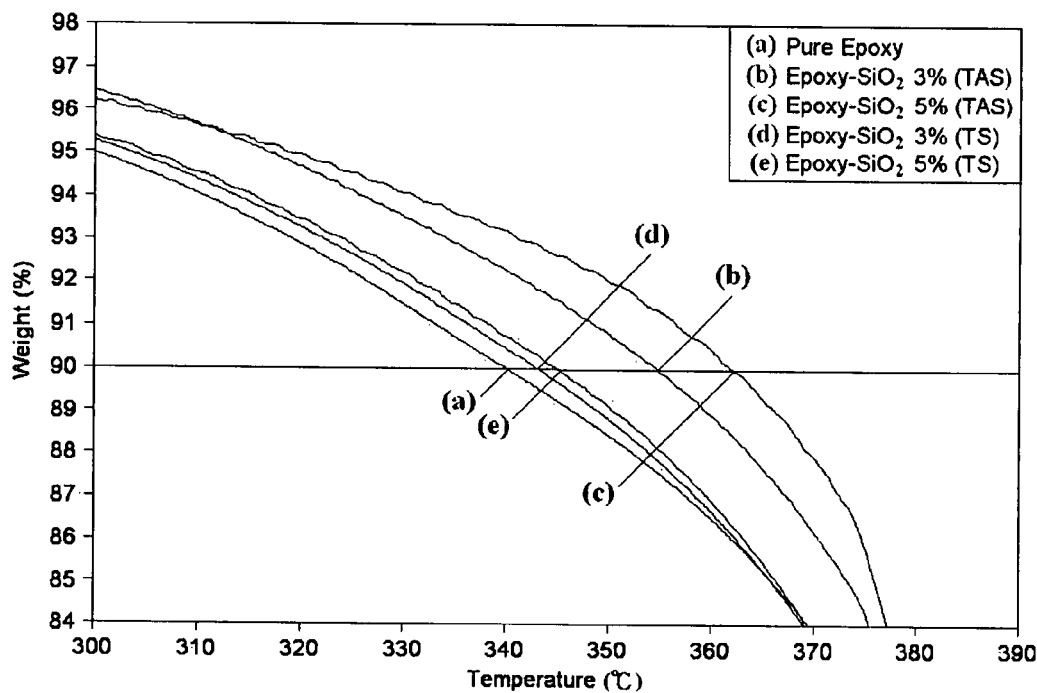
FIG. 7B is an enlarged view of part C of FIG. 7A.

Refer to FIG. 7A & FIG. 7B, thermal gravimetric analysis curves of epoxy/TAS and epoxy/TS are revealed and a three-stage curve is observed. In the beginning, most of thermal weight loss (120□) is evaporation of some solvents or decomposition of small molecular, not weight loss caused by decomposition of polymer main chain. Thus decomposed temperature ($T_d$) is defined as temperature of 10% weight loss of the sample. As to char yield, it is residual weight of material Due to high temperature, a layer of char is formed on surface of the sample and the sample is enclosed by the char. Due to flame retarding effect of the char, certain amount of the sample covered therein is left. Under high temperature, inorganic material such as modified silicon dioxide with high flash point may still remain while organic material is already burned out. Thus when the amount of modified silicon dioxide (TS, TAS) added increases, theoretically char yield will also increase.

Moreover, along with increasing amount of modified silicon dioxide added, decomposed temperature of the material is also raised. The increasing of decomposition temperature results from better distribution of modified $SiO_2$. During combustion processes, release of heat and combustible gas is effectively blocked by the modified $SiO_2$. Thus continuous decomposition of epoxy is affected and the decomposition temperature is increased. Therefore, thermal stability of composite material is improved by addition of modified $SiO_2$ in epoxy substrate.

Furthermore, it is also learned that decomposition temperature of epoxy/TAS is higher than that of epoxy/TS due to better distribution of TAS in epoxy than that of TS in epoxy.

2. Differential Scanning Calorimetry (DSC) Analysis

By differential scanning calorimetry (DSC), thermal properties of the material are studied and further the glass transition temperature ($T_g$) of material is defined.

Figure 8:
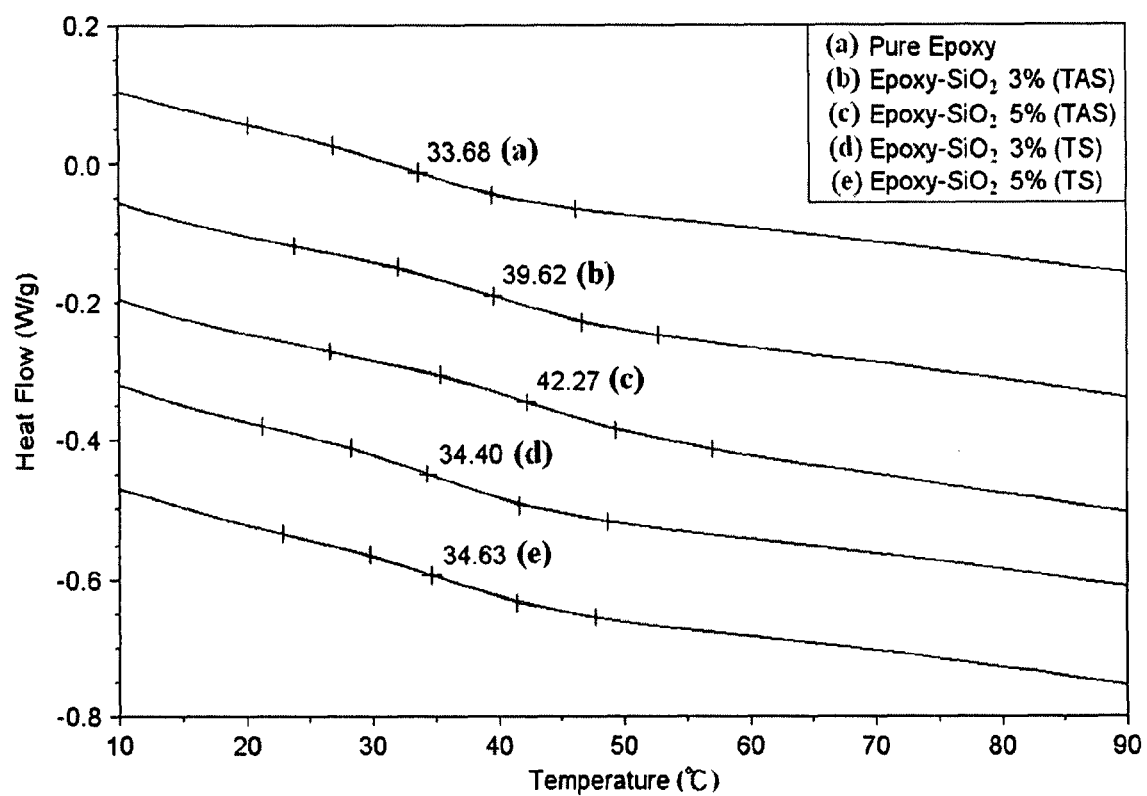
FIG. 8 is a differential scanning calorimetry (DSC) of epoxy/modified silicon dioxide corrosion resistant nanocomposite material added with various amount of TAS or TS according to the present invention.

Refer to FIG. 8, through differential scanning calorimetry (DSC) of epoxy/TAS or epoxy/TS, the glass transition temperature ($T_g$) of material increases in accordance with amount of modified $SiO_2$ being added. Generally, glass transition temperature ($T_g$) of material is affected by folding, mobility and flexibility of molecular chain. The mobility of the main chain of polymer is restricted by modified $SiO_2$ distributed in polymer so that the molecular chain moves slower with lower mobility. Thus it needs higher temperature to change polymers from glassy state to rubbery state. In epoxy/TAS, distribution of TAS in epoxy is better than that of TS in epoxy in epoxy/TS so that the glass transition temperature ($T_g$) of epoxy/TAS is higher.

Mechanical Properties Analysis

Dynamic Mechanical Analysis (DMA)

This method measures deformation of material being affected by sin or other periodic stress. The storage modulus is determined by this analysis while the so-called modulus is defined as the ratio of stress to strain:

$$\text{modulus} = \frac{\text{stress}}{\text{strain}} = \frac{\text{Force/Area}}{\Delta L/L}$$

Figure 9:
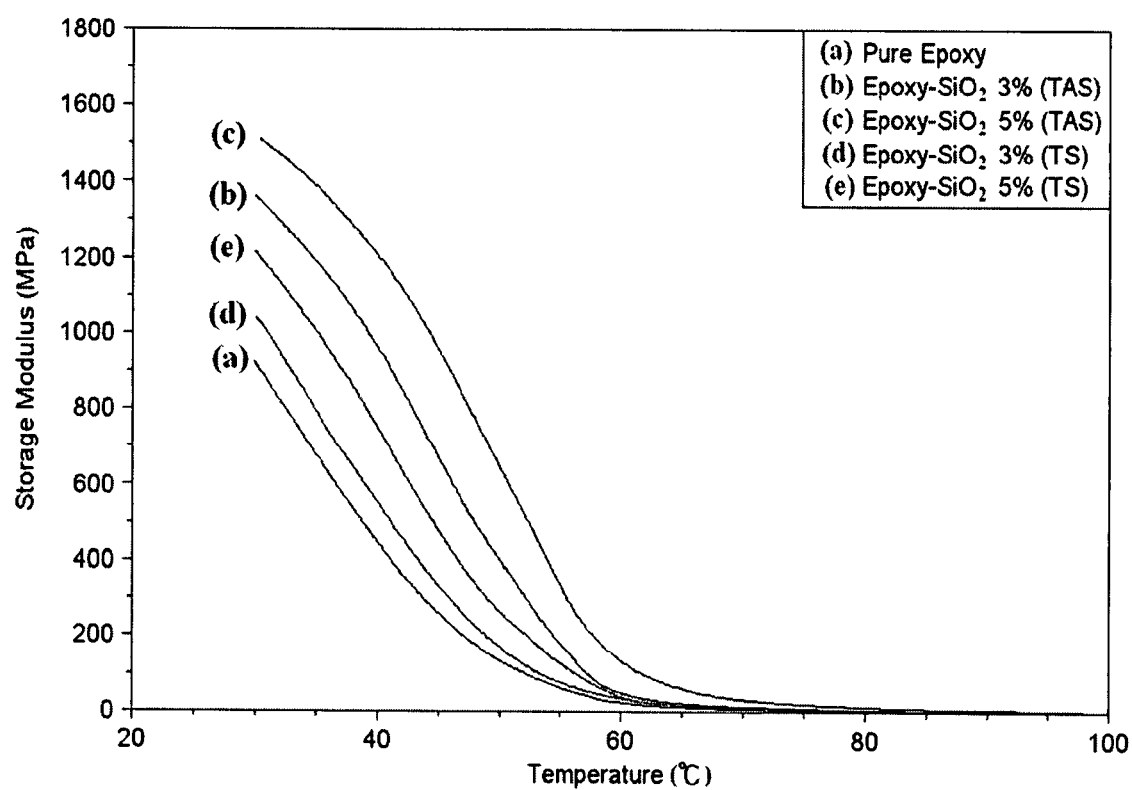
FIG. 9 is dynamic mechanical analysis (DMA) of epoxy/TAS or epoxy/TS nanocomposite material added with various amount of TAS or TS according to the present invention.

FIG. 9 is dynamic mechanical analysis (DMA) of epoxy/TAS or epoxy/TS nanocomposite. Along with increasing amount of modified silicon dioxide added, the storage modulus of the material increases. That means mechanical properties of the material are enhanced. Due to better distribution of TAS in epoxy than distribution of TS in epoxy, increasing of the storage modulus of nanocomposite material added with TAS is more than that of the nanocomposite material added with TS.

Electrochemical Properties Analysis

1. Corrosion Test

In corrosion tests of metal, epoxy/modified silicon dioxide corrosion resistant nanocomposite material with various amount of TAS or TS is coated on cold-rolled steel (CRS) to form working electrode for performing a series of electrochemical measurements so as to get data of corrosion potential ($E_{corr}$), corrosion current ($I_{corr}$) polarization resistance ($R_p$), and corrosion rate (MPY, milli-inches per year, $R_{corr}$). The results are in the list one.

The higher the corrosion potential is, the larger the polarization resistance is, the smaller the corrosion current is, and the more corrosion resistant the material is. According to data in list one, cold-rolled steel coated with epoxy/modified silicon dioxide nanocomposite corrosion resistant material has higher corrosion potential than the cold-rolled steel without the coated layer. Moreover, along with increasing amount of TAS or TS, the corrosion protection of epoxy/modified silicon dioxide nanocomposite material is effectively improved.

List one: corrosion tests results of epoxy/modified silicon dioxide nanocomposite

| sample | thickness of coating (μm) | electrochemical measurements | | | |
|---|---|---|---|---|---|
| | | $E_{corr}$ (mV) | $R_p$ (kΩ × cm$^2$) | $I_{corr}$ (μA/cm$^2$) | $R_{corr}$ (MPY) |
| Bare | — | −664.1 | 10.61 | 3.4500 | 3.21 |
| Epoxy | 10 | −605.3 | 33.68 | 1.8734 | 1.74 |
| TAS3% | 13 | −532.3 | 113.18 | 0.9530 | 0.89 |
| TAS5% | 14 | −499.4 | 141.67 | 0.8779 | 0.82 |
| TS3% | 17 | −586.8 | 49.10 | 1.5984 | 1.49 |
| TS5% | 18 | −553.3 | 70.78 | 1.1632 | 1.08 |

The corrosion protection of epoxy/modified silicon dioxide nanocomposite material results from modified $SiO_2$ distributed in polymer substrate. For oxygen ($O_2$) and water ($H_2O$) molecule, it takes longer path and more time to arrive metal surface so that corrosion is delayed. The oxidation of cold-rolled steel is slowed down. Thus corrosion prevention is achieved.

Figure 10:
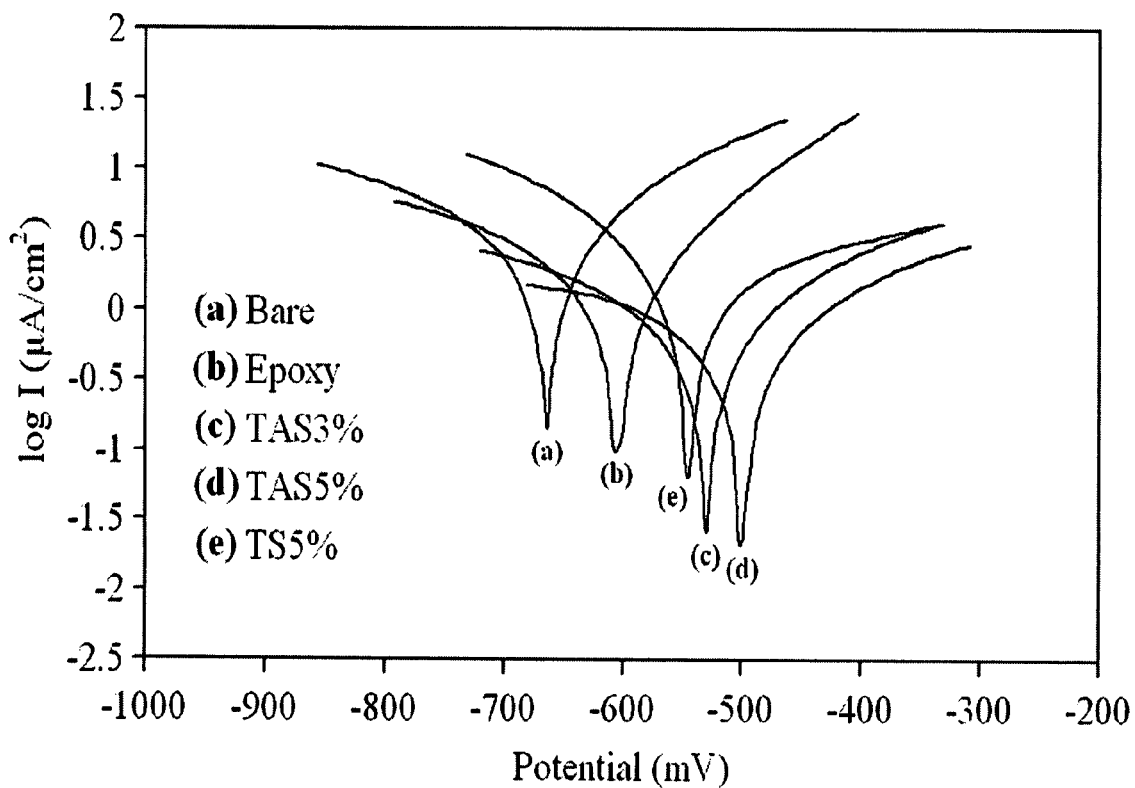
FIG. 10 a Tafel Curve of epoxy/modified silicon dioxide nanocomposite material added with various amount of TAS or TS according to the present invention.

Refer to FIG. 10, through a Tafel Curve of epoxy/modified silicon dioxide nanocomposite material added with various amount of TAS or TS, it is observed that nanocomposite material added with TAS has higher corrosion potential and the smaller corrosion current. That means the material is with better corrosion protection caused by better distribution of TAS molecule that effectively blocks penetration of oxygen molecule and water molecule.

2. Electrochemical Impedance Spectroscopy (EIS) Analysis

By data of corrosion potential ($E_{corr}$), corrosion current ($I_{corr}$) polarization resistance ($R_p$), and corrosion rate ($R_{corr}$, unit-MPY, milli-inches per year), it is learned that the Epoxy/modified $SiO_2$ nonacomposite material is corrosion resistant. Now an impedance test is further used to prove its corrosion protection.

Figure 11:
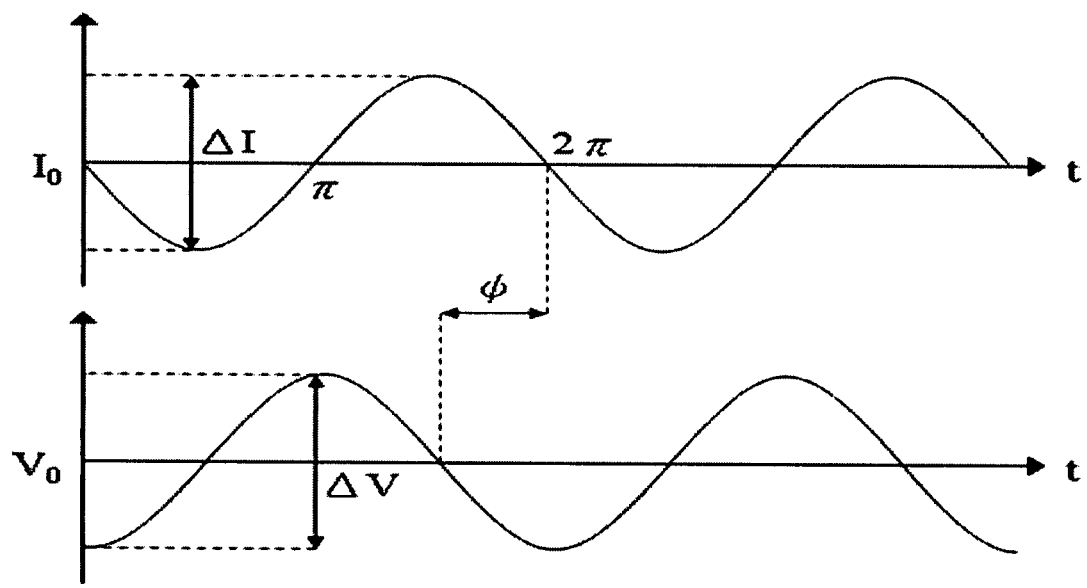
FIG. 11 is a schematic drawing showing variations of voltage (V) and current (I) of alternating current.
Figure 12:
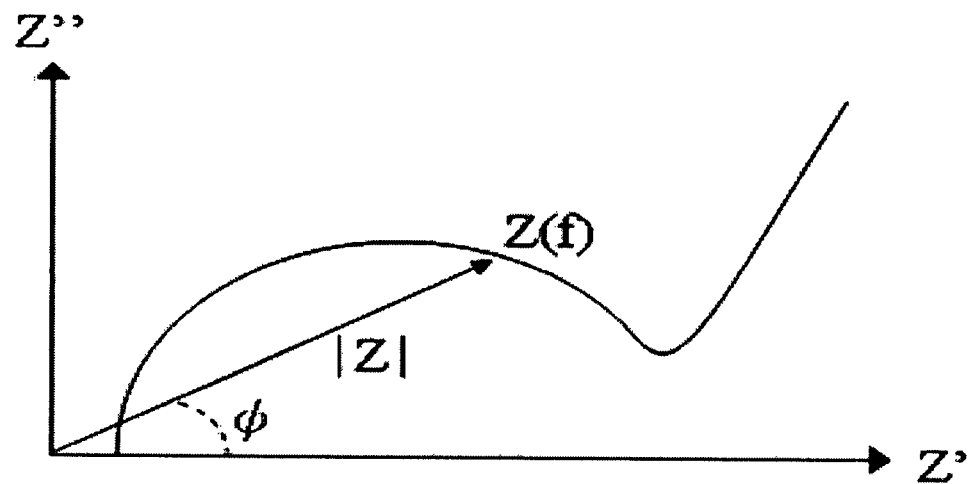
FIG. 12 is impedance on a plurality of planes.

The impedance is considered as correlation between current and potential under stable conditions. AC ((Alternative Current) impedance test method is used to get a value Z. In a direct current circuit, Z=R while in a alternating current circuit, voltage (V) and current (I) of the power are no more constant and they are variation values like Sin(number), as shown in FIG. 11. As to whichever frequency (f), impedance (|Z|) is ratio of |ΔV| to ΔI shown as following, and ψ is phase angle (forwards or backwards):

$$Z(f) = \Delta V/\Delta I = |Z|e^{i\phi} = |\Delta V|e^{2\pi jft}/|\Delta I|e^{j2\pi f(t-\phi)}$$

$$j = \sqrt{-1}$$

or present by real part Z' and imaginary part Z" on a plurality of planes;

$$Z(f) = Z'(f) + jZ''(f)$$

unless pure resistance characteristics, Z is function of frequency f, as shown in FIG. 12.

Figure 13:
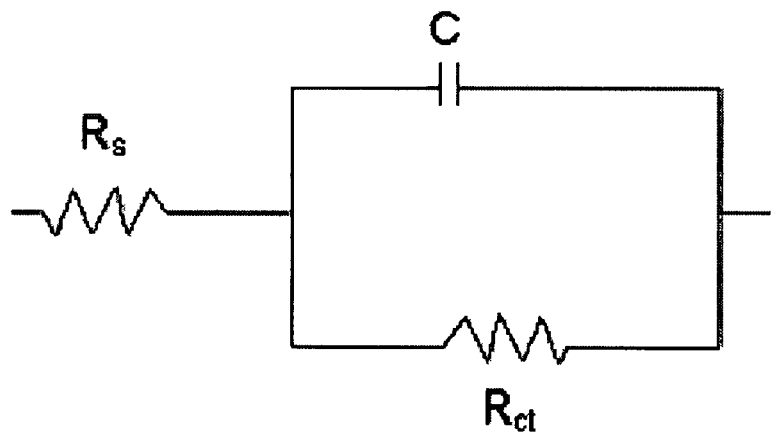
FIG. 13 an equivalent circuit coupled to an electrode.

In fact, the electrode is considered as a circuit formed by resistance capacitor or inductor. Refer to FIG. 13, it is an equivalent circuit coupled to the electrode.

$R_s$ is electrolyte resistance, $R_{ct}$ is charge transfer resistance, C is a capacitor or a double layer capacitor, ω is switching frequency of AC. The impedance Z is represented by the following equation:

$$Z = Z' + jZ'' = R_s + R_{ct}/(1 + \omega jR_{ct}C)$$

the above equation is also represented by Admittance, Y:

$$1/Z = Y = Y' + jY''$$

$$Y' = [R_s + R_{ct} + \omega CR_sR_{ct})^2]/[(R_s + R_{ct}) + (\omega CR_sR_{ct})^2]$$

$$Y'' = \omega CR_{ct}^2/[(R_s + R_{ct})^2 + (\omega CR_sR_{ct})^2]$$

wherein $$Z' = Y'/(Y'^2 + Y''^2)$$

$$Z'' = Y''/(Y'^2 + Y''^2)$$

after elimination of ω, $$[Z - (R_s + \tfrac{1}{2}R_{ct})]^2 + (Z'')^2 = (R_{ct}/2)^2$$

Figure 14:
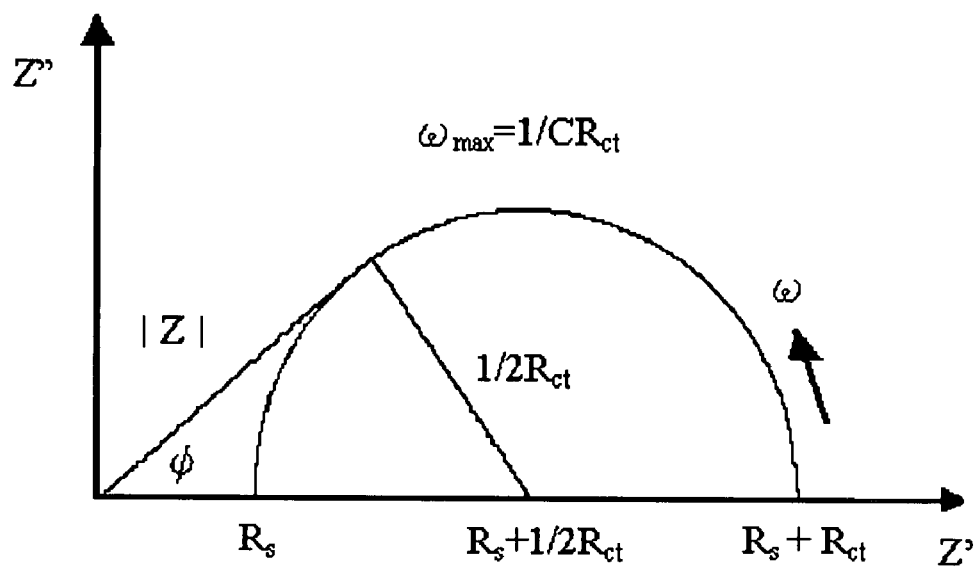
FIG. 14 is a figure of Nyquist Plot.

Refer to FIG. 14, semi-circle shown up by above equation is called Nyquist Plot.

Figure 15:
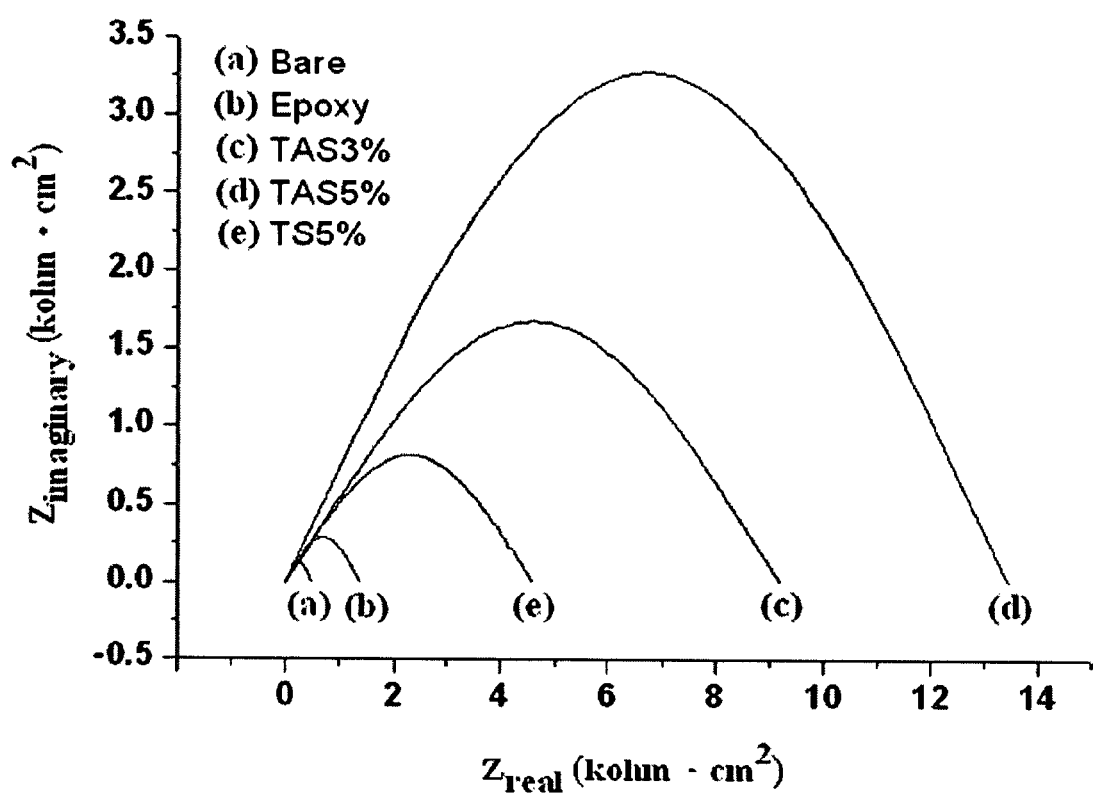
FIG. 15 is a Nyquist Plot with curves represent epoxy/modified silicon dioxide nanocomposite material added with various amount of TAS or TS measured in 5 wt % $NaCl_{(aq)}$.

Refer to FIG. 15, a Nyquist Plot, curves shown represent corrosion resistant nanocomposite material formed by epoxy added with various amount of TAS or TS measured in 5 wt % $NaCl_{(aq)}$. This test mainly determines value of real part $Z_{real}$ of the impedance. The larger the impedance value is, the more difficult the water or oxygen penetrate the coating layer. Thus better corrosion protection is provided. Similarly, test results show that addition of TAS provides better anti-corrosion effect of the material than addition of TS. The reason is the same with the one mentioned in Corrosion test. Once again, epoxy/modified silicon dioxide nanocomposite material is proved to be corrosion resistant.

Analysis of Barrier Properties

1. Gas Permeability Analyzer (GPA)

When modified silicon dioxide is distributed in polymer substrate (epoxy) in nano-scale, it's globoid and distributed evenly. While external gas molecule enters the polymer substrate and diffuses therein, the globoid modified silicon dioxide blocks the gas molecule so that the gas molecule needs to get around the silicon dioxide. Thus the path of diffusion is extended and gas barrier is achieved. If the gas being blocked is oxygen, such material can be applied to fire-retardant materials, and corrosion resistant materials. Once the object being blocked is moisture, such material is applied to storage material and food packaging materials.

By above Corrosion test, it is learned that evenly distribution of modified silicon dioxide in polymer substrate effectively prevents metal corrosion. Thus research of corrosion prevention is further derived to gas barrier and moisture barrier properties.

Figure 16:
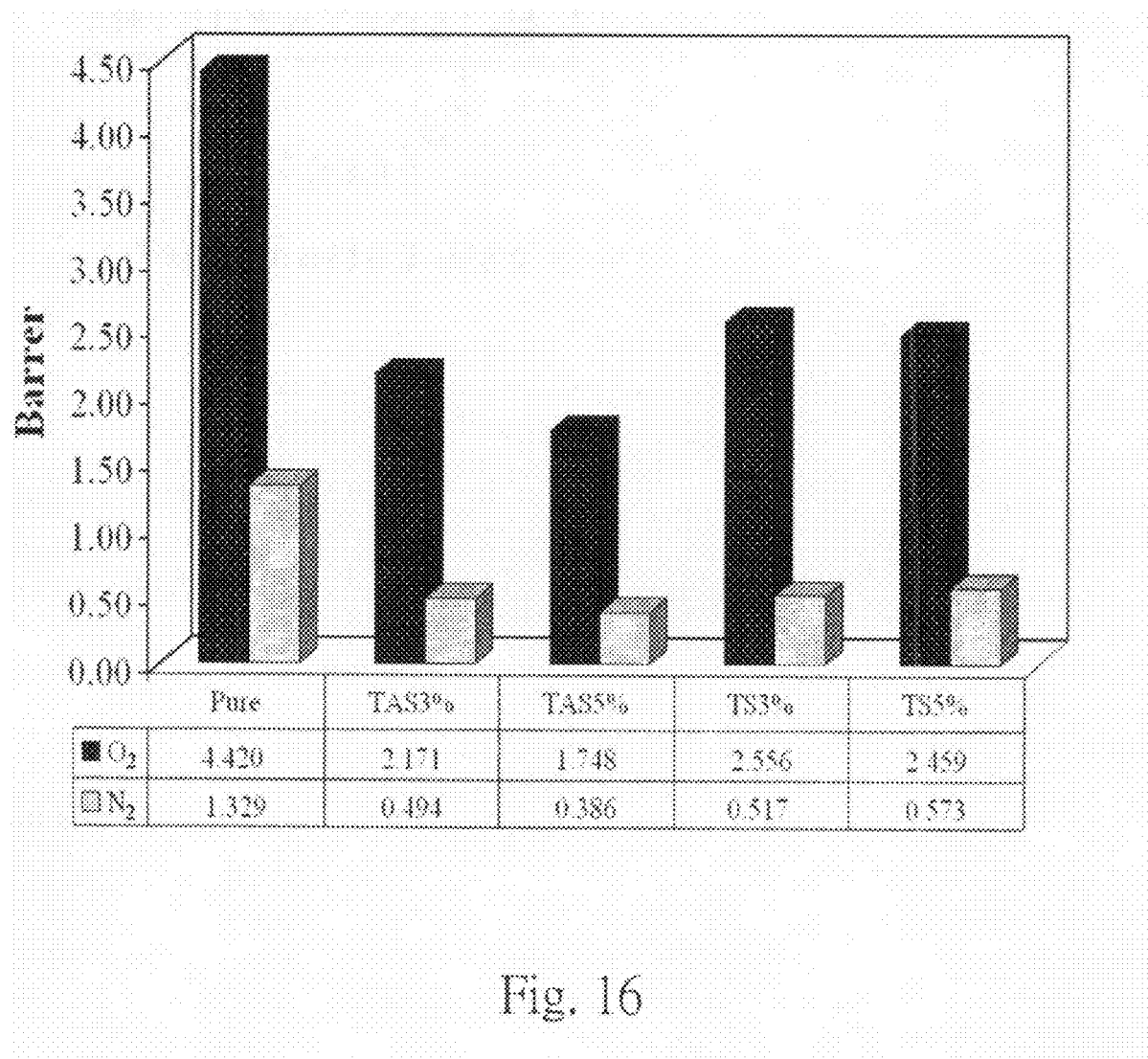
FIG. 16 is a bar chart showing oxygen permeability and nitrogen permeability of epoxy/modified silicon dioxide corrosion resistant nanocomposite material added with different amount of TAS or TS according to the present invention.

Refer to FIG. 16, a bar chart demonstrates oxygen permeability and nitrogen permeability of epoxy/modified silicon dioxide corrosion resistant nanocomposite material added with different amount of TAS or TS. It is learned that along with increasing amount of modified silicon dioxide added, gas barrier property of the material is enhanced. Moreover, within these materials, the epoxy/modified silicon dioxide nanocomposite added with TAS has better barrier effectiveness than other materials because distribution of TAS in epoxy is more evenly than distribution of TS in epoxy.

2. Moisture Permeability Test

Figure 17:
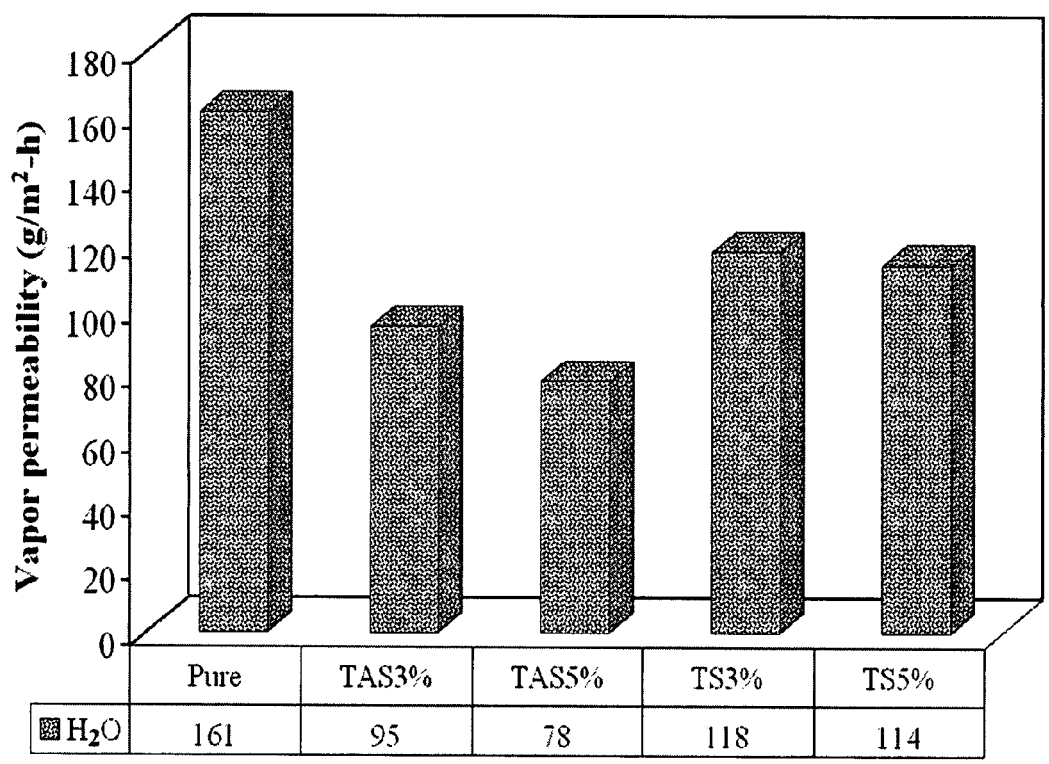
FIG. 17 is a histogram bar chart showing moisture permeability of epoxy/modified silicon dioxide corrosion resistant nanocomposite material added with different amount of TAS or TS according to the present invention.

A moisture permeability test is further performed. Refer to FIG. 17, it is learned that along with increasing amount of modified silicon dioxide (TS or TAS) added, moisture barrier property of the material is improved. As above embodiment, the nanocomposite material added with TAS has better barrier effectiveness than other materials because distribution of TAS in material is more evenly than distribution of TS in material.

In summary, by means of moisture permeability test, gas permeability analyses of oxygen and nitrogen, and corrosion test, epoxy/modified silicon dioxide corrosion resistant nanocomposite material of the present invention is proved to have gas barrier effectiveness and corrosion prevention so that is can be applied to optoelectronics, fire-retardant materials, food packaging materials, corrosion resistant materials or other fields for corrosion prevention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A preparation method of epoxy/modified silicon dioxide corrosion resistant nanocomposite material, comprising the steps of:
dispersing tetraethyl orthosilicate-silicon dioxide (TEOS-$SiO_2$) or 3-aminopropyltriethoxysilane (APTES)/TEOS-$SiO_2$ in a solvent to form a TEOS-$SiO_2$ solution or a APTES/TEOS-$SiO_2$ solution;
adding triphenylolmethane triglycidyl ether and 1,4-butanediol diglycidyl ether into the TEOS-$SiO_2$ solution or APTES/TEOS-$SiO_2$ solution to produce glycidyl ether/TEOS-$SiO_2$ solution or glycidyl ether/APTES/TEOS-$SiO_2$ solution;
adding a curing agent into the glycidyl ether/TEOS-$SiO_2$ solution or glycidyl ether/APTES/TEOS-$SiO_2$ solution to generate epoxy/TEOS-$SiO_2$ solution or epoxy/APTES/TEOS-$SiO_2$ solution; and
curing the epoxy/TEOS-$SiO_2$ solution or the epoxy/APTES/TEOS-$SiO_2$ solution to produce epoxy/modified silicon dioxide nanocomposite corrosion resistant material while the epoxy/modified silicon dioxide is epoxy/TEOS-$SiO_2$ or epoxy/APTES/TEOS-$SiO_2$, wherein during said curing process a temperature is elevated from room temperature to 50° C. to be maintained at said 50° C. for 11-12 hours, wherein the temperature is further increased from said 50° C. to 80° C. to be maintained at said 80° C. for 0.5 hour with the following increase of the temperature from said 80° C. to 100° C. to be maintained at said 100° C. for 6-8 hours, wherein the temperature is further increased from said 100° C. to 120° C. to be maintained at said 120° C. for 0.5 hour, and wherein the temperature is consequently decreased from said 120° C. to the room temperature;
wherein the TEOS-$SiO_2$ or the APTES/TEOS-$SiO_2$ constitutes 1-10 wt % of the epoxy/modified silicon dioxide nanocomposite corrosion resistant material.

2. The preparation method as claimed in claim 1, wherein the step of dispersing TEOS-$SiO_2$ or APTES/TEOS-$SiO_2$ in the solvent to form TEOS-$SiO_2$ solution or APTES/TEOS-$SiO_2$ solution further comprises the step of using a sol-gel method to prepare the TEOS-$SiO_2$.

3. The preparation method as claimed in claim 2, wherein the sol-gel method comprises the step of hydrolysis and condensation of tetraethyl orthosilicate, alcohol and an acid to produce a TEOS-$SiO_2$ sol-gel solution.

4. The preparation method as claimed in claim 3, wherein the step of dispersing TEOS-$SiO_2$ or APTES/TEOS-$SiO_2$ in the solvent to form the TEOS-$SiO_2$ solution or the APTES/TEOS-$SiO_2$ solution further comprises the step of modifying the TEOS-$SiO_2$ to produce the APTES/TEOS-$SiO_2$.

5. The preparation method as claimed in claim 4, wherein the step of modifying the TEOS-$SiO_2$ to produce the APTES/TEOS-$SiO_2$ further comprises the step of reacting APTES with an acid to produce a first solution.

6. The preparation method as claimed in claim 5, wherein after the step of reacting APTES with the acid to produce a first solution, the method further comprises the steps of adding the first solution into the TEOS-$SiO_2$ sol-gel solution and mixing evenly to produce APTES/TEOS-$SiO_2$.

7. The preparation method as claimed in claim 1, wherein in the step of dispersing TEOS-$SiO_2$ or APTES/TEOS-$SiO_2$ in solvent to form the TEOS-$SiO_2$ solution or the APTES/TEOS-$SiO_2$ solution, the solvent is N,N-dimethylacetamide.

8. The preparation method as claimed in claim 1, wherein a weight ratio of the triphenylolmethane triglycidyl ether to the 1,4-butanediol diglycidyl ether is 1:1.

9. The preparation method as claimed in claim 1, wherein the curing agent is trimethylolpropane tris[poly(propylene glycol), amine terminate] ether.

10. The preparation method as claimed in claim 9, wherein a weight ratio of the triphenylolmethane triglycidyl ether to the trimethylolpropane tris[poly(propylene glycol), amine terminated] ether is 1:0.5408.

11. The preparation method as claimed in claim 9, wherein a weight ratio of the 1,4-butanediol diglycidyl ether to the trimethylolpropane tris[poly(propylene glycol), amine terminated] ether is 1:0.8209.

12. The preparation method as claimed in claim 1, wherein a reaction temperature of the step of adding the curing agent into the glycidyl ether/TEOS-SiO$_2$ solution or glycidyl ether/APTES/TEOS-SiO$_2$ solution to generate epoxy/TEOS-SiO$_2$ solution or epoxy/APTES/TEOS-SiO$_2$ solution is room temperature.

13. The preparation method as claimed in claim 1, wherein the epoxy/modified silicon dioxide corrosion resistant nanocomposite material is the epoxy/APTES/TEOS-SiO$_2$.

14. The preparation method as claimed in claim 1, wherein the TEOS-SiO$_2$ or the APTES/TEOS-SiO$_2$ constitutes 5 wt % of the epoxy/modified silicon dioxide nanocomposite corrosion resistant material.

* * * * *